US007787892B2

(12) United States Patent
Yang et al.

(10) Patent No.: US 7,787,892 B2
(45) Date of Patent: Aug. 31, 2010

(54) METHOD AND APPARATUS FOR ADAPTIVE MULTI-STAGE MULTI-THRESHOLD DETECTION OF PAGING INDICATORS IN WIRELESS COMMUNICATION SYSTEMS

(75) Inventors: Hong Kui Yang, San Diego, CA (US); Jing Su, San Diego, CA (US)

(73) Assignee: VIA Technologies, Inc., Taipei (TW)

( * ) Notice: Subject to any disclaimer, the term of this patent is extended or adjusted under 35 U.S.C. 154(b) by 1071 days.

(21) Appl. No.: 11/492,742

(22) Filed: Jul. 25, 2006

(65) Prior Publication Data

US 2007/0076643 A1    Apr. 5, 2007

Related U.S. Application Data

(60) Provisional application No. 60/724,136, filed on Oct. 5, 2005.

(51) Int. Cl.
    *H04B 7/00*    (2006.01)
(52) U.S. Cl. .................. 455/458; 370/311; 370/324; 370/503; 455/423; 455/434; 455/67.11; 455/67.13; 455/455
(58) Field of Classification Search .......... 455/423, 455/458, 432.1, 434, 455, 67.11, 67.13, 115.1; 370/311, 324, 503
    See application file for complete search history.

(56) References Cited

U.S. PATENT DOCUMENTS

| | | | |
|---|---|---|---|
| 4,467,140 A | 8/1984 | Fathauer et al. ............ 179/2 EA |
| 4,737,979 A | 4/1988 | Hashimoto .................... 379/82 |
| 4,912,757 A | 3/1990 | Ossandon .................... 379/217 |
| 4,980,907 A | 12/1990 | Raith et al. .................... 379/63 |
| 5,243,645 A | 9/1993 | Bissell et al. ................. 379/211 |
| 5,311,570 A | 5/1994 | Grimes et al. ................. 379/57 |
| 5,479,408 A | 12/1995 | Will ............................ 370/94.1 |
| 5,486,814 A | 1/1996 | Quinones ..................... 340/573 |
| 5,544,223 A | 8/1996 | Robbins et al. ............... 379/58 |
| 5,624,265 A | 4/1997 | Redford et al. ........... 434/307 R |
| 5,625,884 A | 4/1997 | Gitlin et al. ................. 455/54.1 |
| 5,734,984 A | 3/1998 | Reece et al. ................. 455/458 |
| 5,765,109 A | 6/1998 | Chavez, Jr. .................. 455/435 |
| 5,802,470 A | 9/1998 | Gaulke et al. ............... 455/426 |
| 5,826,173 A | 10/1998 | Dent ......................... 455/38.3 |
| 5,835,490 A | 11/1998 | Park et al. ................... 370/342 |
| 5,845,204 A | 12/1998 | Chapman et al. ........... 455/343 |
| 5,873,043 A | 2/1999 | Comer ....................... 455/458 |
| 5,930,706 A | 7/1999 | Raith ......................... 455/422 |
| 5,940,758 A | 8/1999 | Chavez, Jr. et al. ......... 455/432 |
| 5,977,872 A | 11/1999 | Guertin ...................... 340/515 |
| 5,991,600 A | 11/1999 | Anderson et al. .......... 455/38.3 |

(Continued)

*Primary Examiner*—Kamran Afshar
*Assistant Examiner*—Babar Sarwar
(74) *Attorney, Agent, or Firm*—K&L Gates LLP (57) ABSTRACT

A method and system is disclosed for detecting paging indicators using a multi-stage and multi-threshold detection mechanism so that a mobile terminal can be removed from an idle mode appropriately. After receiving a first paging indicator, it is determined whether a first indicator measurement corresponding to the first paging indicator is between a first and a second predetermined thresholds. After receiving a second paging indicator which may be a temporal diversity counterpart of the first paging indicator, a second indicator measurement derived based on both the first and second paging indicators is compared against a third predetermined threshold, wherein the mobile terminal is removed from the idle mode when both comparisons are appropriately conducted.

47 Claims, 5 Drawing Sheets

U.S. PATENT DOCUMENTS

| | | | |
|---|---|---|---|
| 5,991,635 A | 11/1999 | Dent et al. | 455/517 |
| 6,011,321 A | 1/2000 | Stancu et al. | 307/10.5 |
| 6,035,188 A | 3/2000 | Hoogerwerf et al. | 455/411 |
| 6,047,178 A | 4/2000 | Frian | 455/423 |
| 6,075,470 A | 6/2000 | Little et al. | 341/107 |
| 6,085,086 A | 7/2000 | La Porta et al. | 455/432 |
| 6,107,558 A | 8/2000 | Cowan | 84/488 |
| 6,131,013 A | 10/2000 | Bergstrom et al. | 455/63 |
| 6,138,025 A | 10/2000 | Lee et al. | 455/453 |
| 6,144,974 A | 11/2000 | Gartland | 707/517 |
| 6,148,253 A | 11/2000 | Taguchi et al. | 701/48 |
| 6,167,251 A | 12/2000 | Segal et al. | 455/406 |
| 6,216,004 B1 | 4/2001 | Tiedemann, Jr. et al. | 455/442 |
| 6,226,677 B1 | 5/2001 | Slemmer | 709/227 |
| 6,246,335 B1 | 6/2001 | Tsunoda | 340/825.44 |
| 6,249,222 B1 | 6/2001 | Gehlot | 340/540 |
| D447,138 S | 8/2001 | Arpe | D14/336 |
| 6,282,178 B1 | 8/2001 | Noerpel et al. | 370/316 |
| 6,282,542 B1 | 8/2001 | Carneal et al. | 707/10 |
| 6,290,349 B1 | 9/2001 | Silverbrook et al. | 347/87 |
| 6,307,846 B1 | 10/2001 | Willey | 370/329 |
| 6,317,604 B1 | 11/2001 | Kovach, Jr. et al. | 455/456 |
| 6,321,257 B1 | 11/2001 | Kotola et al. | 709/219 |
| 6,333,939 B1 | 12/2001 | Butler et al. | 370/503 |
| 6,343,219 B1 | 1/2002 | Wada | 455/550 |
| 6,343,377 B1 | 1/2002 | Gessner et al. | 717/10 |
| 6,344,795 B1 | 2/2002 | Gehlot | 340/540 |
| 6,363,258 B1 | 3/2002 | Schmidt et al. | 455/514 |
| RE37,618 E | 4/2002 | Helferich | 341/110 |
| 6,370,375 B1 | 4/2002 | Shively | 455/412 |
| D457,881 S | 5/2002 | Arpe | D14/336 |
| 6,393,278 B1 | 5/2002 | Buchanan et al. | 455/426 |
| 6,393,285 B1 | 5/2002 | Stephens | 455/435 |
| 6,408,384 B1 | 6/2002 | Adams | 712/227 |
| 6,421,540 B1 | 7/2002 | Gilhousen et al. | 455/458 |
| 6,445,923 B1 | 9/2002 | Fujimori et al. | 455/434 |
| 6,446,177 B1 | 9/2002 | Tanaka et al. | 711/163 |
| 6,449,701 B1 | 9/2002 | Cho | 711/154 |
| 6,469,992 B1 | 10/2002 | Schieder | 370/329 |
| 6,480,096 B1 | 11/2002 | Gutman et al. | 340/5.31 |
| 6,484,037 B1 | 11/2002 | Schmidt et al. | 455/514 |
| 6,490,457 B1 | 12/2002 | Lee | 455/458 |
| 6,505,058 B1 | 1/2003 | Willey | 455/574 |
| 6,507,743 B1 | 1/2003 | Abrishamkar et al. | 455/458 |
| 6,516,200 B1 | 2/2003 | Schmidt et al. | 455/518 |
| 6,519,180 B2 | 2/2003 | Tran et al. | 365/185.03 |
| 6,522,879 B2 | 2/2003 | Myer et al. | 455/426 |
| 6,532,369 B1 | 3/2003 | Myer | 455/517 |
| 6,539,211 B1 | 3/2003 | Abrishamkar et al. | 455/161.2 |
| 6,560,318 B1 | 5/2003 | Spielman et al. | 379/88.12 |
| 6,564,378 B1 | 5/2003 | Satterfield et al. | 725/40 |
| 6,590,886 B1 | 7/2003 | Easton et al. | 370/342 |
| 6,594,493 B1 | 7/2003 | Davies et al. | 455/436 |
| 6,639,907 B2 * | 10/2003 | Neufeld et al. | 370/342 |
| 6,643,611 B1 | 11/2003 | Ito et al. | 702/184 |
| 6,650,873 B2 | 11/2003 | Chen et al. | 455/69 |
| 6,650,912 B2 | 11/2003 | Chen et al. | 455/574 |
| 6,659,341 B1 | 12/2003 | Wang | 235/379 |
| 6,687,285 B1 * | 2/2004 | Jou | 375/133 |
| 6,687,508 B1 | 2/2004 | Dwyer et al. | 455/466 |
| 6,690,292 B1 | 2/2004 | Meadows et al. | 340/905 |
| 6,690,777 B2 | 2/2004 | Pecht | 379/100.01 |
| 6,694,144 B1 | 2/2004 | Zhang | 455/458 |
| 6,694,323 B2 | 2/2004 | Bumbulis | 707/101 |
| 6,697,651 B2 | 2/2004 | Li | 455/574 |
| 6,708,040 B1 | 3/2004 | Laroia et al. | 455/515 |
| 6,711,413 B1 * | 3/2004 | Heidari | 455/515 |
| 6,724,740 B1 | 4/2004 | Choi et al. | 370/335 |
| 6,725,053 B2 | 4/2004 | Rosen et al. | 455/518 |
| 6,738,617 B2 | 5/2004 | Rosen et al. | 455/418 |
| 6,745,026 B2 | 6/2004 | Lortz | 455/420 |
| 6,745,056 B2 | 6/2004 | Wang et al. | 455/574 |
| 6,747,561 B1 | 6/2004 | Reeves | 340/573.1 |
| 6,748,295 B2 | 6/2004 | Tilles et al. | 700/241 |
| 6,763,231 B2 | 7/2004 | Takatori et al. | 455/420 |
| 6,771,616 B2 | 8/2004 | Abrishamkar et al. | 370/320 |
| 6,778,997 B2 | 8/2004 | Sundaresan et al. | 707/104.1 |
| 6,782,274 B1 | 8/2004 | Park et al. | 455/552.1 |
| 6,784,899 B1 | 8/2004 | Barrus et al. | 345/717 |
| 6,795,425 B1 | 9/2004 | Raith | 370/345 |
| 6,795,450 B1 | 9/2004 | Mills et al. | 370/463 |
| 6,795,711 B1 | 9/2004 | Sivula | 455/466 |
| 6,804,528 B1 | 10/2004 | Laroia et al. | 455/503 |
| 6,816,736 B2 | 11/2004 | Laroia et al. | 455/458 |
| 6,823,191 B2 | 11/2004 | Laroia et al. | 455/458 |
| 6,823,192 B2 | 11/2004 | Jou et al. | 455/458 |
| 6,829,485 B2 | 12/2004 | Abrishamkar et al. | 455/458 |
| 6,831,632 B2 | 12/2004 | Vardi | 345/179 |
| 6,836,651 B2 | 12/2004 | Segal et al. | 455/405 |
| 6,862,528 B2 | 3/2005 | Scannell | 702/3 |
| 6,865,398 B2 | 3/2005 | Mangal et al. | 455/552.1 |
| 6,873,831 B2 | 3/2005 | Attar et al. | 455/127.2 |
| 6,876,636 B2 | 4/2005 | Sinnarajah et al. | 370/312 |
| 6,895,058 B2 | 5/2005 | Abrishamkar et al. | 375/259 |
| 6,895,249 B2 | 5/2005 | Gaal | 455/456.1 |
| 6,904,288 B2 | 6/2005 | Rosen et al. | 455/518 |
| 6,912,244 B2 | 6/2005 | Challa et al. | 375/149 |
| 6,912,372 B2 | 6/2005 | McCorkle et al. | 455/39 |
| 6,912,401 B2 | 6/2005 | Rosen et al. | 455/518 |
| 6,915,328 B2 | 7/2005 | Turnbull | 709/203 |
| 6,917,987 B2 | 7/2005 | Parthasarathy et al. | 709/249 |
| 6,922,561 B2 | 7/2005 | Chen et al. | 455/435.1 |
| 6,928,148 B2 | 8/2005 | Simon et al. | 379/39 |
| 6,934,550 B2 | 8/2005 | Kearney et al. | 455/458 |
| 6,937,578 B1 | 8/2005 | Hunzinger | 370/311 |
| 6,937,712 B2 | 8/2005 | Lemchen et al. | 379/159 |
| 6,937,863 B1 | 8/2005 | Gordon et al. | 455/446 |
| 6,950,624 B2 | 9/2005 | Kim et al. | 455/3.01 |
| 6,955,298 B2 | 10/2005 | Herle | 235/472.01 |
| 6,959,265 B1 | 10/2005 | Candela et al. | 702/186 |
| 6,971,060 B1 | 11/2005 | Bujak et al. | 715/501.1 |
| 6,980,820 B2 | 12/2005 | Sinnarajah et al. | 455/515 |
| 6,983,288 B1 | 1/2006 | Kirkwood et al. | 707/103 |
| 6,993,329 B2 | 1/2006 | Cho et al. | 455/420 |
| 6,996,131 B1 | 2/2006 | Islam et al. | 370/514 |
| 6,999,729 B2 | 2/2006 | Wandel | 455/69 |
| 7,006,468 B1 | 2/2006 | Chen et al. | 370/330 |
| 7,009,954 B2 | 3/2006 | Abrishamkar | 370/335 |
| 6,226,677 C1 | 4/2006 | Slemmer | 709/227 |
| 2002/0093920 A1 | 7/2002 | Neufeld et al. | 370/311 |
| 2002/0123357 A1 | 9/2002 | Abrishamkar et al. | 455/458 |
| 2002/0142784 A1 * | 10/2002 | Abrishamkar et al. | 455/458 |
| 2002/0159427 A1 | 10/2002 | Cleveland | 370/342 |
| 2003/0008691 A1 | 1/2003 | Chen et al. | 455/574 |
| 2003/0114132 A1 * | 6/2003 | Yue | 455/343 |
| 2003/0143951 A1 | 7/2003 | Challa et al. | 455/20 |
| 2004/0176147 A1 | 9/2004 | Escalante | 455/574 |
| 2005/0020292 A1 * | 1/2005 | Kim | 455/515 |
| 2005/0181731 A1 | 8/2005 | Asghar et al. | 455/63.1 |
| 2005/0190858 A1 | 9/2005 | Kim et al. | 375/296 |
| 2005/0277429 A1 * | 12/2005 | Laroia et al. | 455/458 |

* cited by examiner

METHOD AND APPARATUS FOR ADAPTIVE MULTI-STAGE MULTI-THRESHOLD DETECTION OF PAGING INDICATORS IN WIRELESS COMMUNICATION SYSTEMS

CROSS REFERENCE

The present application claims the benefits of U.S. Provisional Application Ser. No. 60/724,136, which was filed on Oct. 5, 2005 entitled "Method and Apparatus for Multi-Stage Multi-Threshold Detection of Paging Indicator in Wireless Communication Systems."

BACKGROUND

The present invention relates generally to wireless communication systems, and more particularly to a method and system for detecting the presence of paging indicators in a wireless communication signal.

In wireless communication systems, a mobile terminal remains in an idle mode to conserve battery power when there is neither voice nor data call. In the idle mode, the mobile terminal wakes up periodically for a short period, typically in the order of milliseconds, to monitor a paging indicator to detect whether there is a paging made to the mobile terminal. A relative simple predetermined algorithm is typically used to decide whether the paging indicator indicates that there is an ongoing or an up-and-coming voice or data call. If the outcome of the predetermined algorithm is affirmative, the mobile terminal switches on to decode information communicated through a common channel, which may contain a dedicated or broadcast message in a temporal period of up to 100 ms. If the final determination based on the simple algorithm is negative, the mobile terminal returns to a "sleep mode", wherein most of the mobile terminal's components are turned off to conserve battery power while keeping a few critical components on to maintain basic timing requirement during the "sleep mode". As known by those skilled in the art, the more often the mobile terminal has to decode information in the common channel, the more power the mobile terminal must consume. As such, there is a need to increase standby time, or the amount of time that the mobile terminal is in "sleep mode".

To increase the standby time, a wireless communication system that regularly communicates with the mobile terminal transmits the same paging indicator several times over time to indicate whether there is paging to the mobile terminal. For example, $3^{rd}$ Generation Partnership Project 2 describes a quick paging channel (QPCH) designed for this purpose in a CDMA2000 environment. "Physical Layer Standard for CDMA2000 Spread Spectrum Systems," 3GPP2 C.S0002, March, 2000. See also "Upper Layer (Layer 3) Signaling Standard for CDMA2000 Spread Spectrum Systems (2000)", 3GPP2 C.S0005, March, 2000. The QPCH indicators are normally on/off keyed to reduce transmission power. The indicator is repeated once to obtain temporal fading diversity information.

To conserve battery power, it is critical to detecting the presence of the paging indicator reliably and efficiently. Due to the presence of noise and fading in aerial communications, the signal-to-noise ratio (SNR) may become very low, a condition that renders any detection mechanism a challenging task. There are generally two types of errors associated with paging. A type I error, a false alarm error, is an incorrect paging detection that may cause a false alarm that in turn causes more battery power. A type II error, a miss error, is an incorrect detection that missed a voice/data call. In wireless communication systems, the detection mechanism has to be designed such that false alarms are minimized without exponentially increasing the miss rate.

A single-stage detection mechanism is disclosed in prior art references wherein one threshold is set for a given false alarm and is to maximize the detection probability. See more in "Fundamentals of Statistical Signal Processing: Detection Theory", Prentice Hall PTR, $1^{st}$ Edition, March 1993. However, because only a single threshold is used while the channel gain ratio is changing, the mechanism cannot feasibly minimize the false alarm and miss rate simultaneously for multi-stage paging indicator detection. Other prior methods, while addressing some of the aforementioned issues, are not efficient in a multi-stage detection of paging indicators.

Without an efficient detection mechanism, either more battery power is consumed, or a high miss rate is inevitable, thereby giving a poor communication performance. As such, there exists a need for improving existing methods for detecting paging indicators.

SUMMARY

In view of the foregoing, the following provides a method for detecting a paging indicator in a wireless communication system.

A method and system is disclosed for detecting paging indicators using a multi-stage and multi-threshold detection mechanism so that a mobile terminal can be removed from an idle mode appropriately. After receiving a first paging indicator, it is determined whether a first indicator measurement corresponding to the first paging indicator is between a first and a second predetermined thresholds. After receiving a second paging indicator which is temporal diversity counterpart of the first paging indicator, a second indicator measurement derived based on both the first and second paging indicators is compared against a third predetermined threshold, wherein the mobile terminal is removed from the idle mode when both comparisons are appropriately conducted. The indicator measurements and the thresholds are derived in such a way that the channel conditions and predetermined configurations of the paging channel are both factored in.

The construction and method of operation of the invention, however, together with additional objects and advantages thereof will be best understood from the following description of specific embodiments when read in connection with the accompanying drawings.

DESCRIPTION

The following will provide a detailed description of a method and system having multiple decision stages for determining the presence of a paging indicator in wireless communication systems. The subject matter set forth herein is applicable to wireless communication systems that multiplex signals using techniques of time division multiplexing (TDM), code division multiplexing (CDM), and frequency division multiplexing (FDM). For explanation purposes, a CDMA2000 system is used as one example.

In a wireless communications system such as a CDMA2000 system, several paging indicators are implemented. A paging indicator is understood by those skilled in the art to be a signal for detecting the presence of a paging signal, and to be broadly defined to include but not limited to the following paging indicator examples. For example, a quick paging channel paging indicator is designed for the paging channel (PCH). Another quick paging channel configuration change indicator is designed for the common control channel (CCCH). Yet another quick paging channel broadcast indicator is designed for the broadcast control channel (BCCCH). In each paging slot cycle in a CDMA2000 system, two paging indicators, I1 and I2, are transmitted, wherein I2 is a temporal diversity counterpart of I1. These two indicators span over the channel coherence length (about 20 ms) to gain temporal diversity. Assuming that the received symbol signal is expressed as $r_{i,k,l}$, where i is the paging indicator index (1 or 2 for I1 or I2, respectively), k is the index of the multi-path including diversity branch, and l is the quadrature phase shift keying (QPSK) symbol index, where QPSK is understood to be a digital frequency modulation technique for sending digital data over a communication channel, its corresponding estimated radio channel information is $a_{i,k,l}$, which represents the channel condition. Measurement metrics corresponding to the paging indicators can then be obtained through a predetermined combining method. For example, through a simple pilot weighted combining methodology, three quick paging indicator measurement metrics for $x_1$, $x_2$ and $x_3$ are denoted as:

$$x_1 = \sum_{l=1}^{L} \sum_{k=1}^{K1} (\text{Re}(a_{1,k,l}^* \cdot r_{1,k,l}) + \text{Im}(a_{1,k,l}^* \cdot r_{1,k,l})) \quad \text{(Eq. 1a)}$$

$$x_2 = \sum_{l=1}^{L} \sum_{k=1}^{K1} (\text{Re}(a_{2,k,l}^* \cdot r_{2,k,l}) + \text{Im}(a_{2,k,l}^* \cdot r_{2,k,l})) \quad \text{(Eq. 2a)}$$

$$x_3 = \sum_{l=1}^{L} \sum_{k=1}^{K1} (\text{Re}(a_{1,k,l}^* \cdot r_{1,k,l}) + \text{Im}(a_{1,k,l}^* \cdot r_{1,k,l})) + \\ \sum_{l=1}^{L} \sum_{k=1}^{K2} (\text{Re}(a_{2,k,l}^* \cdot r_{2,k,l}) + \text{Im}(a_{2,k,l}^* \cdot r_{2,k,l})) \quad \text{(Eq. 3a)}$$

If normalizing the metrics over QPR as well as channel conditions a1 and a2, we obtain the following:

$$x_1 = \frac{\sum_{l=1}^{L} \sum_{k=1}^{K1} (\text{Re}(a_{1,k,l}^* \cdot r_{1,k,l}) + \text{Im}(a_{1,k,l}^* \cdot r_{1,k,l}))}{QPR \cdot \sum_{l=1}^{L} \sum_{k=1}^{K1} |a_{1,k,l}|^2} \quad \text{(Eq. 1b)}$$

$$x_2 = \frac{\sum_{l=1}^{L} \sum_{k=1}^{K1} (\text{Re}(a_{2,k,l}^* \cdot r_{2,k,l}) + \text{Im}(a_{2,k,l}^* \cdot r_{2,k,l}))}{QPR \cdot \sum_{l=1}^{L} \sum_{k=1}^{K} |a_{2,k,l}^*|^2} \quad \text{(Eq. 2b)}$$

$$x_3 = \frac{\sum_{l=1}^{L} \sum_{k=1}^{K1} (\text{Re}(a_{1,k,l}^* \cdot r_{1,k,l}) + \text{Im}(a_{1,k,l}^* \cdot r_{1,k,l})) + \sum_{l=1}^{L} \sum_{k=1}^{K2} (\text{Re}(a_{2,k,l}^* \cdot r_{2,k,l}) + \text{Im}(a_{2,k,l}^* \cdot r_{2,k,l}))}{QPR \left( \sum_{l=1}^{L} \sum_{k=1}^{K1} |a_{1,k,l}|^2 + \sum_{l=1}^{L} \sum_{k=1}^{K2} |a_{2,k,l}|^2 \right)} \quad \text{(Eq. 3b)}$$

Also the normalization can be done over either QPR, or channel conditions a1 and a2, or something else. Mathematically, these equations are the same. Normalization helps in mathematical analysis and detection device implementation, as demonstrated in the late descriptions.

where K1, K2 are respectively the number of multi-paths (including diversity branches) for I1 and I2, L is the number of QPSK symbols per paging indicator, QPR is a ratio between the powers of the quick paging indicator and a pilot signal and also known as the channel gain informed by the base station. In CDMA2000 systems, QPR has a mathematical representation of $QPR = 10^{(QPCH\_POWER\_LEVEL\_PAGE+3)/20}$ and QPCH_POWER_LEVEL_PAGE is the paging indicator modulation symbol power level relative to that of the forward pilot channel, which is also defined in CDMA2000 standard. It is understood that to derive the measurement metrics based on channel gain informed by the base station and the estimated radio channel information provides a significant advantage over the prior art reference. The above described method may be referred to as a pilot weight combining method. Using this method, no explicit noise reduction weights are designed to address the noise issue as the effect of the weighting is already achieved. As it is shown, since the $x_1$, $x_2$ and $x_3$ are all a function of and normalized over QPR, there is an inherent adaptive mechanism built in that can work with any communications systems. The summations corresponding to the radio channel information represented by the above equations provides one normalization process so that the analysis can be simplified. It is also understood that the measurement metrics do not have to be normalized, and in fact, the consideration of QPR can be done while determining thresholds that the measurement metrics are going to be compared against (which will be further explained below). By integrating the considerations of QPR and signal-to-noise ratio (SNR) in the derivation and analysis of these measurement metrics and their corresponding thresholds, both the channel condition and channel configuration are factored in so that the paging detection can be very adaptive to various communication environments. In another embodiment, wherein a maximal ratio combining methodology is used, three similar quick paging indicator measurement metrics $x_1$, $x_2$ and $x_3$ are given as follows:

$$x_1 = \sum_{l=1}^{L} \sum_{k=1}^{K1} \left( \text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right) \right) \quad \text{(Eq. 1a')}$$

$$x_2 = \sum_{l=1}^{L} \sum_{k=1}^{K2} \left( \text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right) \right) \quad \text{(Eq. 2a')}$$

$$x^x = \sum_{l=1}^{L} \sum_{k=1}^{K1} \left(\frac{a_{kl} \cdot r_{kl}}{kl} + \frac{a_{kl} \cdot r_{kl}}{kl}\right) + \sum_{l=1}^{L} \sum_{k=1}^{K2} \left[\frac{a_{kl} \cdot r_{kl}}{kl} + \frac{a_{kl}^* \cdot r_{2,k,l}}{2}\right]_{2,k,l} \quad \text{(Eq. 3a')}$$

where $\sigma_{i,k,l}^2$ is the noise variance for the kth paging indicator, the kth multi-path, and the lth symbol. If normalizing the metrics over QPR as well as channel conditions a1 and a2, we obtain the following:

$$x_1 = \frac{\sum_{l=1}^{L} \sum_{k=1}^{K1} \left( \text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right) \right)}{QPR \cdot \sum_{l=1}^{L} \sum_{k=1}^{K} \frac{|a_{1,k,l}|^2}{\sigma_{1,k,l}^2}} \quad \text{(Eq. 1b')}$$

$$x_2 = \frac{\sum_{l=1}^{L} \sum_{k=1}^{K2} \left( \text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right) \right)}{QPR \cdot \sum_{l=1}^{L} \sum_{k=1}^{K} \frac{|a_{2,k,l}|^2}{\sigma_{2,k,l}^2}} \quad \text{(Eq. 2b')}$$

$$x_3 = \frac{\sum_{l=1}^{L} \sum_{k=1}^{K1} \left( \text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right) \right) + \sum_{l=1}^{L} \sum_{k=1}^{K2} \left( \text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right) \right)}{QPR \left( \sum_{l=1}^{L} \sum_{k=1}^{K1} \frac{|a_{1,k,l}|^2}{\sigma_{1,k,l}^2} + \sum_{l=1}^{L} \sum_{k=1}^{K2} \frac{|a_{2,k,l}|^2}{\sigma_{2,k,l}^2} \right)} \quad \text{(Eq. 3b')}$$

Also the normalization can be done over either QPR, or channel conditions a1 and a2, or something else. Mathematically, these equations are the same. Normalization helps in mathematical analysis and detection device implementation, as demonstrated in the late descriptions.

In this method to derive $x_1$, $x_2$ and $x_3$, the noise is factored in and the weighting applied is also appropriately considered. In general, if the noise is higher, the weighting applied should be lower. As seen from the matrix above, the noise variances are placed in the denominator portions to indicate the "reverse proportionate" relation. In this maximum ratio combining method, specific weights are applied as explained above to reduce the noise interference, thereby improving the performance of the system.

The effective signal-to-noise ratios (SNR) of the paging indicators I1 and I2 are referred to as SNR1 and SNR2, respectively. SNR3 is defined to be the combined SNR for I1 and I2. In communication systems, it is understood by those skilled in the art that the SNR is often determined depending on the characteristics of the mobile terminal demodulator, channel condition, and intrinsic noise. For the purpose of this application SNR are used interchangeably with Eb/Nt, which is the ratio of the energy per bit to the effective noise spectral density.

Any decision rule for the determination of paging indicators requires some form of SNR estimation. For example, SNR can be estimated from the pilot signal. The total received power-to-interference ratio, $Ec_p$/Io, expressed in dB, wherein $Ec_p$ and Io are the pilot chip energy and the total received input power spectral density including both signal and interference, respectively. This ratio is readily obtained from the mobile terminal searcher. The quick paging indicator SNR that is given approximately by:

$$SNR = n*(QPR)^2*Ec_p/Io \quad \text{(Eq. 4)}$$

The multiple n is a positive number and equals to (1+G) where G=Ior/Ioc. In one embodiment, the multiple n equals to two. Since $I_o = I_{or} + I_{oc}$, an approximation $I_{oc} \cong \frac{1}{2} I_o$ can be obtained for the bad radio channel condition where $I_{or} \cong I_{oc}$, where the term Ior is the post-channel transmitted power spectral density. In the forward link, Ior is the total transmitted power spectral density for base station(s) in soft handoff. The ratio Ior/Ioc is called geometry in CDMA2000 systems.

Therefore, the SNR approximations for I1 and I2 are as follows:

$$SNR1 = n*R*(QPR)^2*Ec_{p1}/Io_1 \quad \text{(Eq. 5)}$$

$$SNR2 = n*R*(QPR)^2*Ec_{p2}/Io_2 \quad \text{(Eq. 6)}$$

The SNR approximation for the combined I1 and I2 are as follows:

$$SNR3 = n*R*(QPR)^2*[Ec_{p1}/Io_1 + Ec_{p2}/Io_2] \quad \text{(Eq. 7)}$$

where R=256 or 512 for quick paging channel data rate of 4,800 bps or 2,400 bps, respectively, for the CDMA2000 system. The approximation error is about zero when the signal equals to noise plus interference. The estimation is relatively accurate when the geometry (G=Ior/Ioc) is low (e.g., from −5 dB to 5 dB), which corresponds to a low SNR region and matters mostly in terms of detection and decoding. In the decision rule discussed below, the decision thresholds are constant at a high SNR region, which corresponds to a high geometry.

Figure 1:
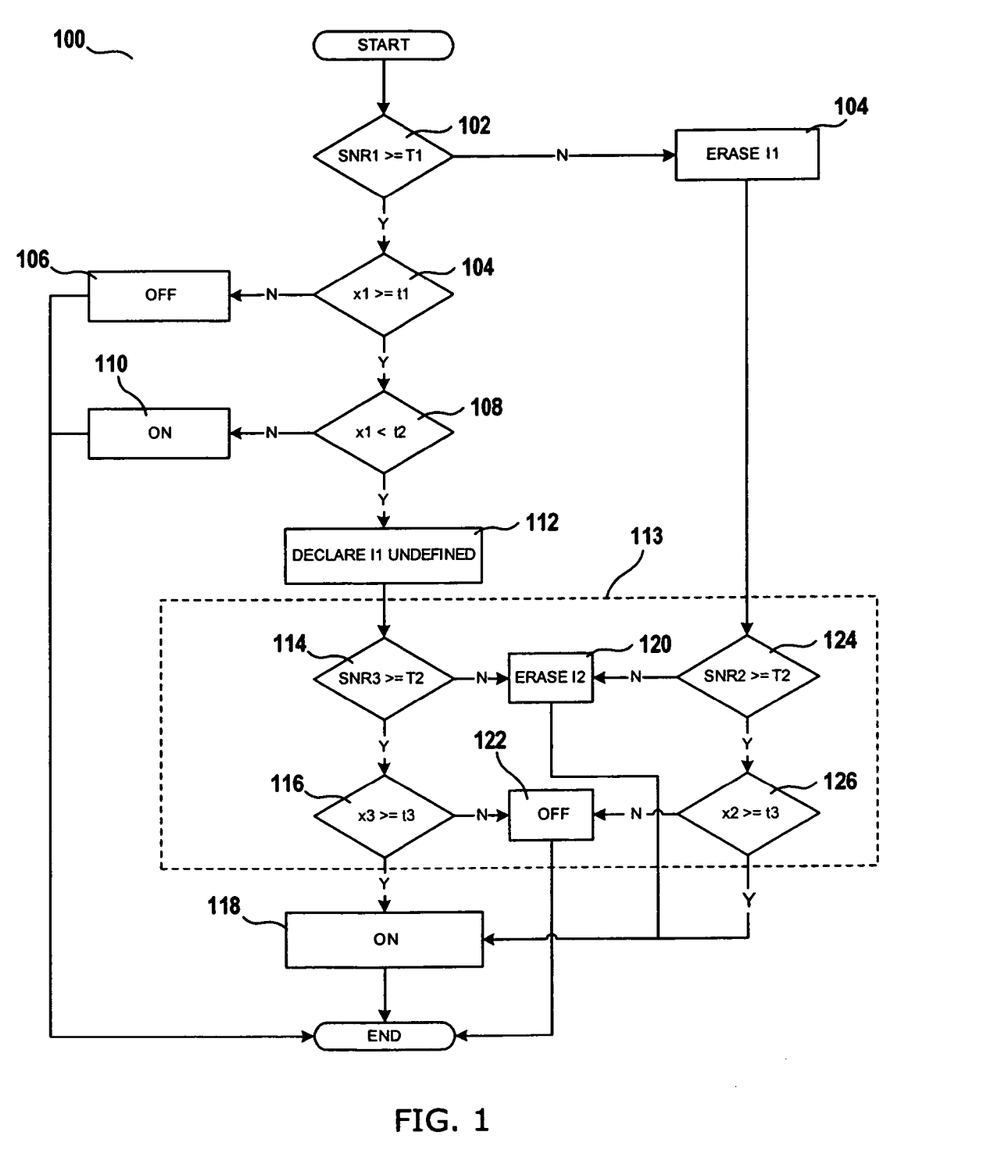
FIG. 1 presents a decision flow diagram in accordance with one embodiment of the present invention.

FIG. 1 provides a flow chart 100 illustrating an improved detection process according to one embodiment of the present invention. In FIG. 1, T1, T2, $t_1$, $t_2$, and $t_3$ are five thresholds determined by a set of predetermined optimization criteria to insure against false alarms and minimize miss rate. For the pilot weighted combining method, the thresholds T1 and T2 are designed, as an optional improvement mechanism, to eliminate signals with too high a noise, i.e., SNR is too small to be reliable for the detection mechanism to apply. These two thresholds, T1 and T2, may be set as the same value, for example, in the simple pilot weighted combining methodology. In other processing methods such as the maximal ratio combining methodology, T1 and T2 could be set at a relatively very low value in order to reduce the probabilities of erasure mechanism. The thresholds $t_1$, $t_2$ and $t_3$ are key thresholds for the multi-stage detection mechanism and are functions of SNR and vary with the immediate radio channel conditions (e.g., QPR, channel fading).

The flow chart 100 starts in a first stage by going through a decision step 102. If SNR1 is very low (e.g. smaller than T1), the indicator I1 is erased in step 104, indicating that the received signal is too small to be considered as a reliable paging indicator. Similarly, if SNR2 for the second indicator I2 is also smaller than T2, as decided in step 124, the indicator I2 is also erased or not considered in step 120 if SNR3 is smaller than T2 (in such case, the mobile terminal is waken up). The probability of indicator erasure 104 and 120 can be lowered by lowering either T1 or T2, or both. For illustration purposes, the other steps of this flow chart are intended to show the multi-stage and multi-threshold detection mechanism as applied to signals with reasonable SNR.

Thresholds are set for comparing measurements against therewith. In this embodiment, three thresholds, all of which are functions of SNR and channel conditions such as QPR etc., are set to improve the system performance. As explained above, the measurement metrics can be derived based on QPR, which factor in the consideration for the channel configuration. When combined with the derived measurement metrics, the fact that the derivation of the thresholds also factors in the consideration of the channel condition (as represented by SNR), the paging indicator determination methods disclosed here are very adaptive to any network environment. It is further understood, and as mentioned above, if the derivation of the measurement metrics does not rely on QPR, the derivation of the thresholds can factor in both SNR and QPR, and the resultant solution is equivalent although the exact mathematical derivation may be different as one skilled in the art can easily understand.

In this embodiment, $t_1$ and $t_2$ are set to avoid high miss and false alarm rates respectively. The third threshold, $t_3$, is set to give considerations on both rates in a separate round. Back in step 102, if the SNR1 is equal to or larger than T1, the flow goes to step 104, wherein the normalized measurement $x_1$ is compared against $t_1$. If $x_1$ is smaller than $t_1$, thereby indicating that the probability of a presence of a paging indicator is likely to be "zero", the flow ends after determining that the mobile terminal should be "OFF" or stay in the idle mode in step 106.

If $x_1$ is equal to or larger than $t_1$, the flow goes to step 108. If $x_1$ is larger than $t_2$, thereby indicating that the probability of a presence of a paging indicator is likely to be "one", the flow ends after determining that the mobile terminal should be "ON" or removed from the idle mode in step 110.

If $x_1$ is smaller than $t_2$, the flow declares in step 112 that I1 is undefined and must enter a second decision stage 113. The first stage uses the first paging indicator and the second stage uses the second paging indicator to be combined with the first paging indication to further determine whether the mobile terminal should wake up. In the first stage, signals are screened so that the indicator signal with an SNR between $t_1$ and $t_2$ is put into further scrutiny in the second stage to reach a better performance. In the second stage, $x_1$ and $x_2$ are combined to get $x_3$ as the only one to be checked against another threshold. In step 114, it is still determined whether the combine SNR3 is compared with T2 to determine whether it is too noisy to be reliable. If SNR3 is smaller than T2, I2 is not considered and erased in step 120 and the mobile terminal can be optionally forced "ON" in the step 118.

If SNR3 is equal to or larger than T2, as determined by the step 114, $x_3$ is compared against $t_3$ in step 116. If $x_3$ is equal to or larger than $t_3$, it is assured that the paging indicator is real and the mobile terminal should wake up, and the flow ends by determining that the mobile terminal should be "ON" in the step 118 to minimize the possibility of a miss call. If $x_3$ is smaller than $t_3$, the flow ends by determining that the mobile terminal should be "OFF" in the step 122. Either way, the second stage detection is completed. When the fist paging indicator I1 is erased in the step 104, the rest flow depends on the second indicator I2. In step 124, if the SNR2 of the second indicator I1 is larger or equals to T2, the flow goes to step 126; otherwise, the I2 would be erased in step 120 in case both SNR1 and SNR2 are lower than their corresponding threshold, T1 and T2. It is better to wake up the mobile terminal to check whether paging exists when receiving two noisy paging indicators. However, it depends on design philosophy and/or implementation considerations in reality. In step 126, if $x_2$ is smaller than $t_3$, the flow ends by determining that the mobile terminal should be "OFF" in the step 122; otherwise, the flow ends by determining that the mobile should be "ON" in the step 118.

As shown above, by varying the thresholds $t_1$ and $t_2$ as a function of SNR, a complete decision rule for I1 can be designed. A lower $t_1$ is used to minimize the miss rate, while a higher $t_2$ is used for declaring "ON" to minimize the false alarm. When the normalized measurement, $x_1$, lies in between $t_1$ and $t_2$, an undefined status is declared in the step 112 and the mobile terminal needs to move to the second decision stage 113 and collect I2 to make a more reliable decision. The combined measurement $x_3$ is used for a more reliable decision as long as the combined SNR is equal to or larger than T2. $t_3$ is also varied and used to favor minimizing miss rate by turning on the mobile terminal.

Figure 2:
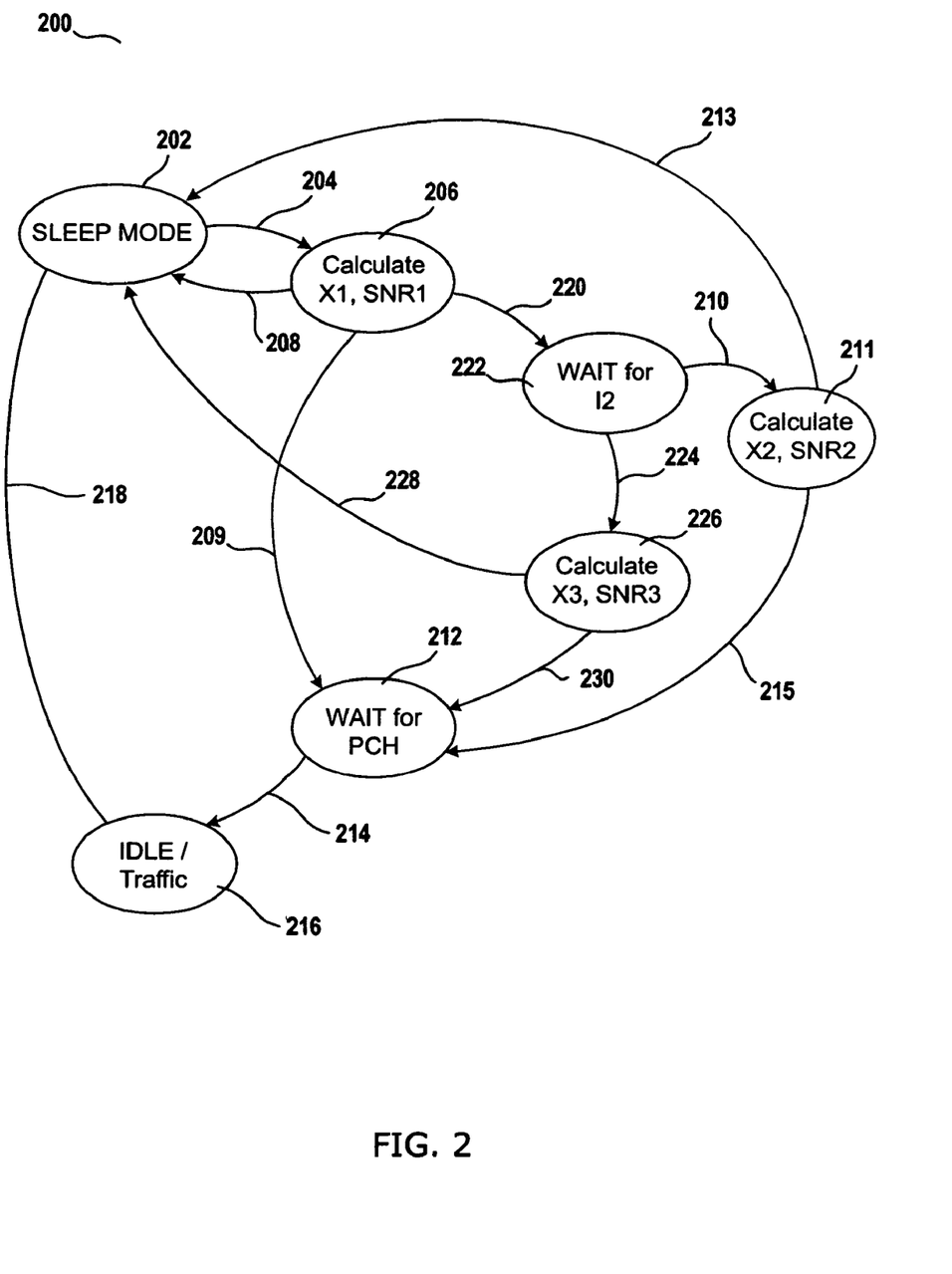
FIG. 2 presents a decision state diagram in accordance with one embodiment of the present invention.

FIG. 2 presents a decision state diagram 200 in accordance with one embodiment of the present invention. The decision state diagram 200 illustrates an example of how the decision rules described above with regard to FIG. 1 may be applied.

Assume that the mobile terminal is first put into a standby mode, or a "sleep mode", in a state 202. After undergoing a certain waiting period as scheduled by a timer as indicated by a path 204, the system then enters a state 206 after the first paging indicator I1 is received, where $x_1$ and SNR1 are calculated. If $x_1$ is too small, it is determined that I1 is "OFF" and the system should go back to sleep (as indicated by a path 208) until the next scheduled paging time. If $x_1$ is equal to or larger than $t_2$, a path 209 determines that I1 indicates the mobile terminal to be "ON" and the system should wake up and go to a state 212 where the system decodes any paging channel message or enters the communication traffic. After decoding, a path 214 leads to a state 216 named IDLE, where the quick paging is set to be inactive. At some point after a path 218, the system returns to the state 202 to wait for the next scheduled application of the decision cycle.

At the state 206, if SNR1 is larger than or equals to T1 and $x_1$ is smaller than $t_2$ (that is, declare that I1 is undefined) or if SNR1 is smaller than T1 (that is, the first quick paging indicator is erased), a path 220 leads the system to a state 222, where the system waits for I2. When I2 is received, a path 224 leads the system to a state 226, where $x_3$ and SNR3 are calculated.

If $x_3$ is smaller than $t_3$, the system is determined to be "OFF" by a path 228, which leads the system back to the state 202. If $x_3$ is equal to or larger than $t_3$, the system is determined to be "ON" by a path 230, which leads the system to the state 212, where the system wakes up and waits for its turn to decode any paging channel message.

Also from the state 222, if I1 is erased, another state 211 is entered through path 210. SNR2 and $x_2$ are obtained after receiving the second paging indicator I2, and comparisons are made against T2 and t3 to decide whether the mobile terminal should stay dormant (represented by path 213) or wake up (as represented by path 215).

Figure 3A:
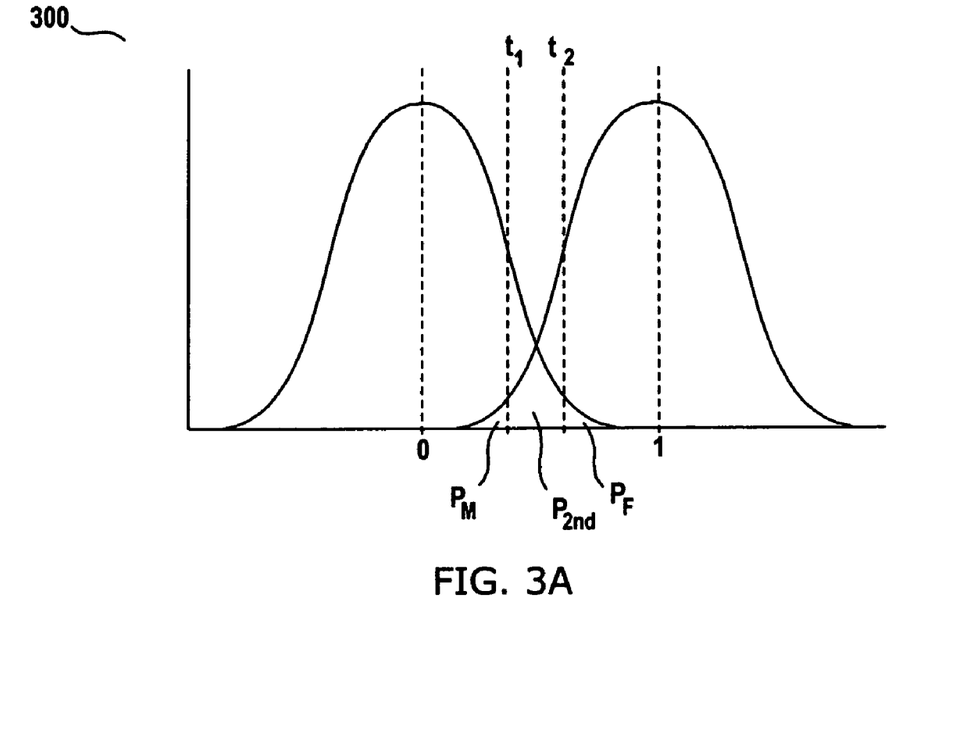
FIG. 3A presents a first probability distribution chart in the first decision stage in accordance with one embodiment of the present invention.
Figure 3B:
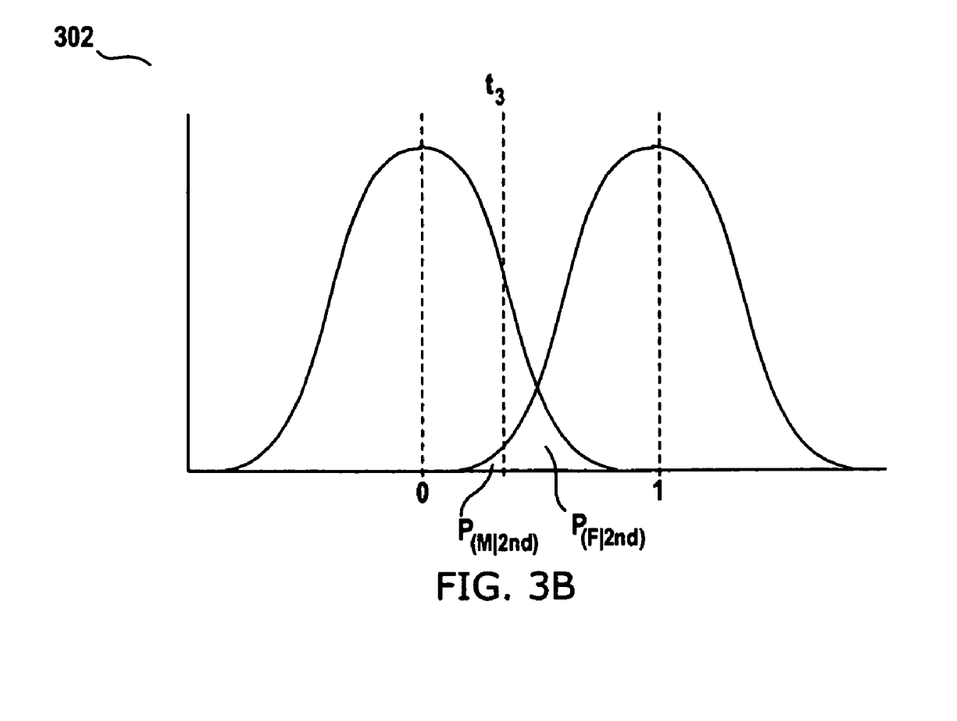
FIG. 3B presents a second probability distribution chart in the second decision stage in accordance with one embodiment of the present invention.
Figure 4:
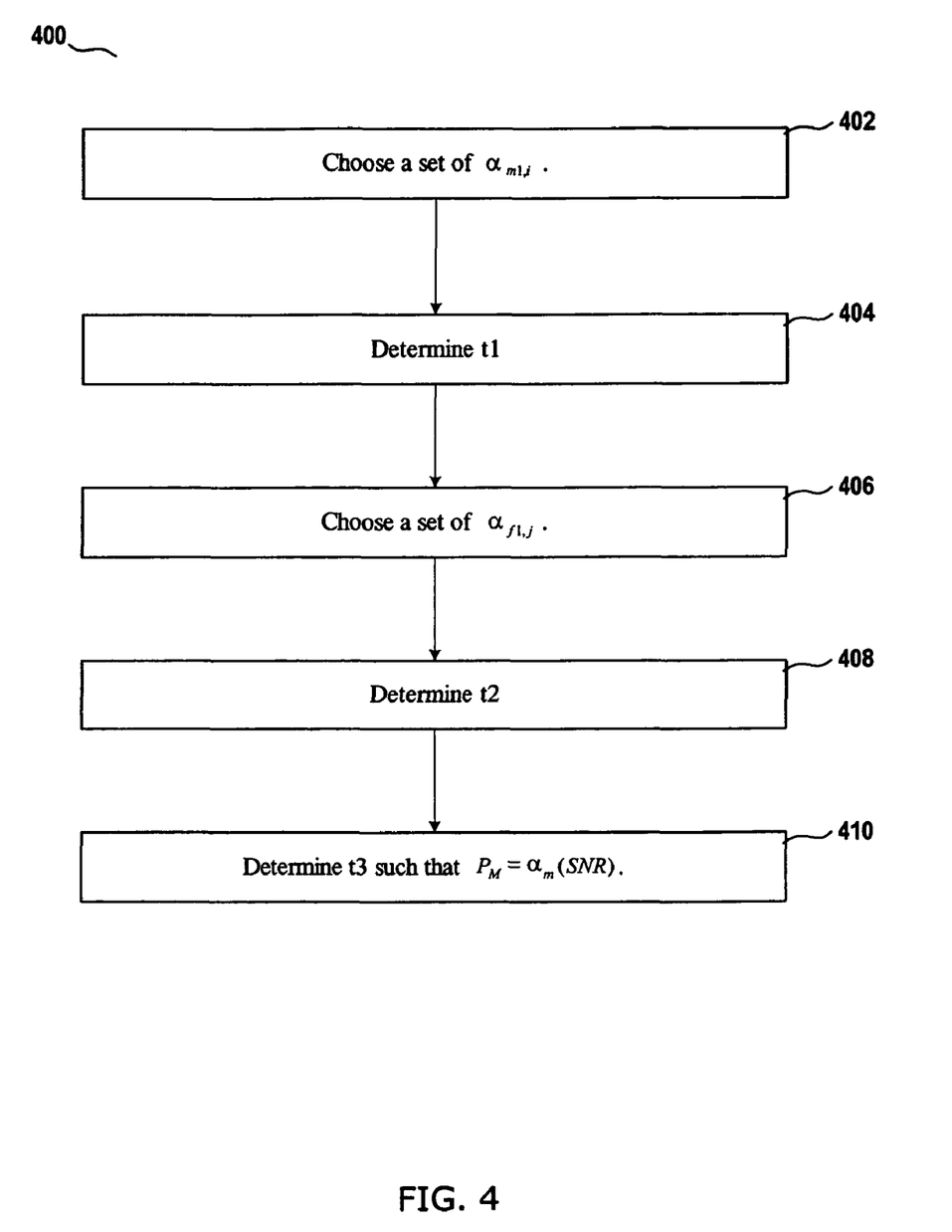
FIG. 4 presents a flow chart for determining thresholds in accordance with one embodiment of the present invention.

FIG. 3A presents a first probability density distribution chart 300 in the first decision stage having only I1 as indicator in accordance with one embodiment of the present invention, whereas FIG. 3B presents a second probability density distribution chart 302 in the second decision stage having combined I1 and I2 as indicators in accordance with one embodiment of the present invention. It is understood that with the normalization process, if there is not a signal in existence, the Gaussian probability density distribution curve should be centered around "0", while the curve for a detected signal should be centered around "1". In both charts 300 and 302, the Gaussian probability density distribution curve to the left indicates the probability that the SNR indicates an "OFF" state for the mobile terminal, whereas the Gaussian curve to the right indicates the probability that the SNR indicates an "ON" state.

In FIG. 3A, any $x_1$ value above $t_2$ indicates that the system should be "ON", whereas any $x_1$ below $t_1$ indicates that the system should be "OFF". The value of the threshold $t_1$ is determinative of the miss rate of the mobile terminal as any $x_1$ less than that will not cause the mobile terminal to wake up. Similarly, the threshold value $t_2$ influences the false alarm rate. As seen in FIG. 3A, when it is closer to "1", the false alarm rate will be lower. It is also recognized that the missed calls and false alarm will always exist in the communication systems, and a better detection mechanism provides a means to control and manage these two important performance benchmarks.

In FIG. 3B, any $x_3$ above $t_3$ indicates that the mobile terminal should be "ON", whereas any $x_3$ below $t_3$ indicates that the mobile terminal should be "OFF". By adjusting $t_1$, $t_2$, and $t_3$, the overall miss rate ($P_M$) is given by:

$$P_M = P_M\{(x_1<t_1) \text{ or } [(t_1<x_1<t_2) \& (x_1x_2<t_3)]\} = P_M(x_1<t_1) + P_M(x_1x_2<t_3)[P_M(x_1<t_2) - P_M(x_1<t_1)] \quad \text{(Eq. 8)}$$

The overall false alarm ($P_F$) rate is given by:

$$P_F = P_F\{(x_1>t_2) \text{ or } [(t_1<x_1<t_2) \& (x_1x_2>t_3)]\} = P_F(x_1>t_2) + P_F(x_1x_2>t_3)[P_F(x_1>t_1) - P_F(x_1>t_2)] \quad \text{(Eq. 9)}$$

The probabilities for the mobile terminal to combine with the second paging indicator are:

$$P_{2nd}(H1) = [P_M(x_1<t_2) - P_M(x_1<t_1)], \text{ when actually transmitting "1"}$$

$$P_{2nd}(H0) = [P_F(x_1>t_1) - P_F(x_1>t_2)], \text{ when actually transmitting "0"} \quad \text{(Eq. 10)}$$

As such, under Additive White Gausian Noise conditions, using the right tail probability, the probability of a miss given that x is smaller than a given threshold is given by:

$$P_M(x<t) = Q((1-t)\sqrt{SNR}) \quad \text{(Eq. 11)}$$

while the probability of a false alarm given that x is larger than a given threshold is given by:

$$P_F(x>t) = Q(t\sqrt{SNR}) \quad \text{(Eq. 12)}$$

The thresholds can be obtained through various methods. For example, they can be derived as:

$$t_1 = 1 - \frac{Q^{-1}(P_M(x<t_1))}{\sqrt{SNR1}} \quad \text{(Eq. 13)}$$

$$t_2 = \frac{Q^{-1}(P_F(x>t_2))}{\sqrt{SNR1}} \quad \text{(Eq. 14)}$$

$$t_3 = 1 - \frac{Q^{-1}((\alpha_{m2}))}{\sqrt{SNR1+SNR2}}, \quad \text{(Eq. 15)}$$

Where the set miss rate used in the second stage $$\alpha_{m2} = \frac{(\alpha_m - P_M(x<t_1))}{Q((1-t2)\sqrt{SNR1}) - Q((1-t1)\sqrt{SNR1})} \quad \text{(Eq. 16)}$$

wherein $\alpha_m$ is the target miss rate.

Under the Rayleigh flat fading condition, the probabilities are:

$$P_M(x<t) = \frac{1}{2}\left[1 - \sqrt{\frac{SNR(1-t)^2}{1+SNR(1-t)^2}}\right] \quad \text{(Eq. 17)}$$

$$P_F(x>t) = \frac{1}{2}\left[1 - \sqrt{\frac{SNR \cdot t^2}{1+SNR \cdot t^2}}\right] \quad \text{(Eq. 18)}$$

The thresholds can then be obtained as:

$$t_1 = 1 - \frac{\sqrt{C_m/(1-C_m)}}{\sqrt{SNR}},$$

where $C_m = (1-2P_M(x<t_1))^2$ \quad (Eq. 19)

$$t_2 = \frac{\sqrt{C_f/(1-C_f)}}{\sqrt{SNR}},$$

where $C_f = (1-2P_F(x>t_2))^2$ \quad (Eq. 20)

For the combined paging indicators, under the Rayleigh flat fading condition, the probabilities are:

$$P_M(x<t) = \frac{1}{2}\left[1 - \sqrt{\frac{SNR(1-t)^2(SNR(1-t)^2+3)^2}{(SNR(1-t)^2+2)^3}}\right] \quad \text{(Eq. 21)}$$

$$P_F(x>t) = \frac{1}{2}\left[1 - \sqrt{\frac{SNR \cdot t^2(SNR \cdot t^2+3)^2}{(SNR \cdot t^2+2)^3}}\right] \quad \text{(Eq. 22)}$$

The threshold can be obtained as:

$$t_3 \cong 1 - \frac{\sqrt{2C_m/(1-C_m)}}{\sqrt{SNR}},$$

where $C_m = (1-2P_M(x<t_3))^2$ \quad (Eq. 23)

The term SNR in the Rayleigh fading conditions denotes the average input SNR, which can be estimated using the equations 5, 6, and 7. As can be seen, the threshold is a function of $(SNR)^{1/2}$. They can be approximated by series expansion as:

$$t = c_0 + c_1 \cdot SNRdB + c_2 \cdot SNRdB^2 + \quad \text{(Eq. 24)}$$

where SNRdB is SNR in dB, $c_0$, $c_1$, $c_1$ and other similar constants are predetermined coefficients.

A specific and efficient implementation variation based on the series expansion method above is to use the piece-wise linear representation, which is:

$$t = t(i) + (SNRdB - SNRdB(i)) \cdot R_s \quad \text{(Eq. 25)}$$

where (SNRdB(i), t(i)) is an intercept point and Rs is the slope in the linear representation of the equation. i is the piece-wise linear segment index and $SNRdB(i) \leq SNRdB \leq SNRdB(i+1)$ and SNRdB is the corresponding SNR. A lookup table can be generated and used to store the intercept and slope.

The present invention provides various advantages over the prior art. The multi-stage detection mechanism using multi-threshold ensures that the communication system achieve the best performance result with respect to miss rate and false alarm rate. Further, while determining the thresholds, they are purposefully set as functions of SNR and/or QPR. By doing so, the detection mechanism is relatively independent of the various channel conditions. As explained above, the measurements of the detection metrics are normalized, although not required. The normalization makes it more adaptive to the channel configuration(as represented by QPR). The proposed invention allows the communication system to configure the optimization criteria with a given miss rate and an intended false alarm rate.

Figure 5:
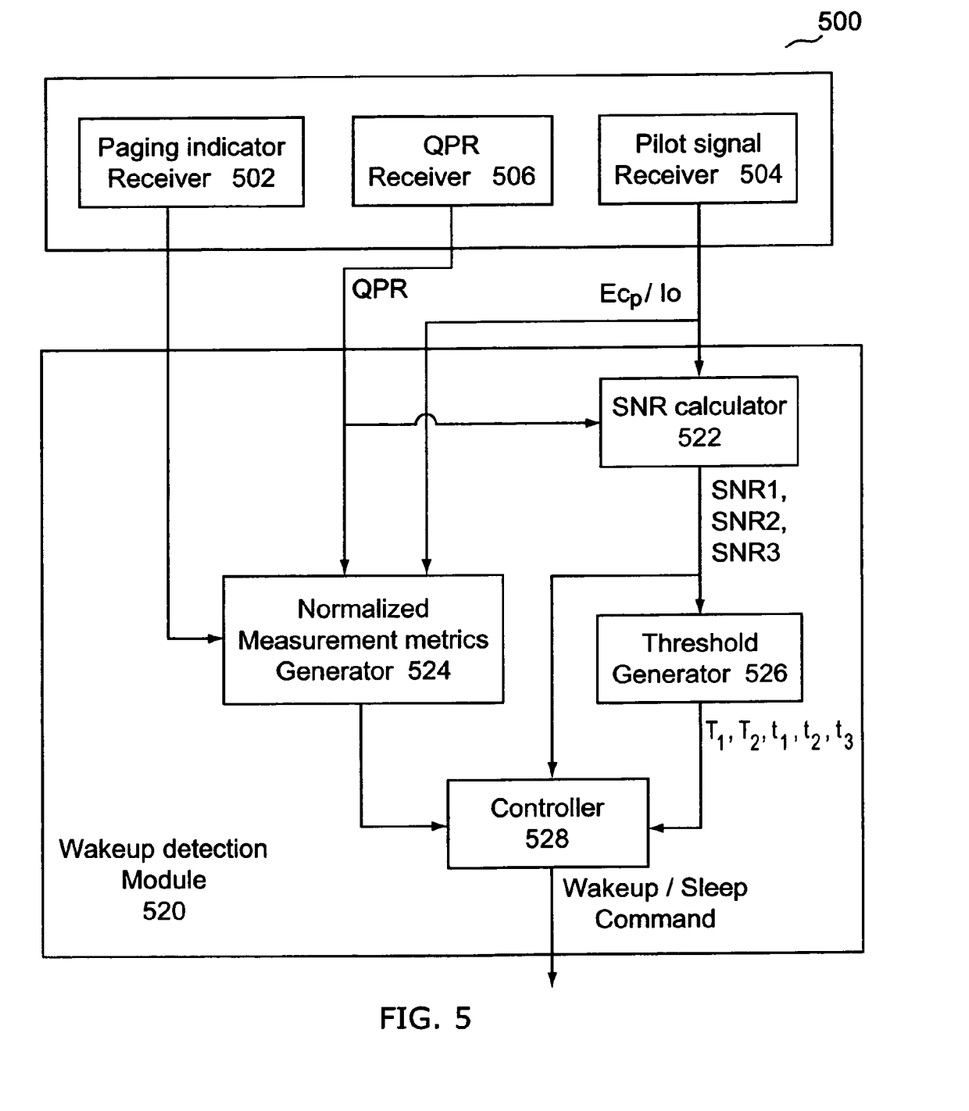
FIG. 5 presents a block diagram of an error detection system in accordance with an embodiment of the present invention.

Please refer to FIG. 5, which is a schematic diagram for a system 500 for detection described above in accordance with one embodiment of the present invention. The system 500 may be implemented in various types of physical arrangement in any mobile terminal. This system 500 comprises at least two modules: one is a receiver module 510, and the other is a wakeup detection module 520. In this regards, the receiver module 510 is configured to receive paging indicators and pilot signal by a paging indicator receiver 502 and a pilot signal receiver 504, respectively. For example, the paging indicator receiver 502 could receive paging indicator in QPCH and deliver the first and second paging indicators I1 and I2 to the wakeup detection module 520. The delivered paging indicators comprise a form expressed as $r_{1,k,l}$ and $r_{2,k,l}$ in Eq. 1, 2, and 3. Besides, the pilot signal receiver 504 is configured to receive a pilot signal in PCH and/or CPICH and sends them to the wakeup detection module 520. Similarly, the pilot signal may comprise $a_{1,k,l}$ and $a_{2,k,l}$ in Eq. 1, 2, and 3. Moreover, the pilot signal receiver 504 could also deliver noise variance parameters, $\sigma_{1,k,l}$ and $\sigma_{2,k,l}$, and total received power-to-interference ratio, $Ec_p/Io$. In this embodiment, the receiver module 510 may comprises a QPR receiver 506, which delivers QPR, a ratio between the power of the quick paging indicator and the pilot signal based on the received symbols and propagated in multiple paths. It is understood by those skilled in the art that the QPR receiver 506 is not limited to carrying out operations as represented in Eq. 1, 2, and 3 or 1', 2', and 3'.

As shown in the FIG. 5, the wakeup detection module 520 is configured to determine whether to wake up the mobile terminal or not based on the information provided by the receiver module 510. In this embodiment, the wakeup detection module 520 further comprises a SNR calculator 522, a normalized measurement metrics generator 524, a threshold generator 526, and a controller 528. The effective SNR of the paging indicators I1 and I2 and a combined one are referred as SNR1, SNR2, and SNR3 could be calculated by the SNR calculator 522.

After receiving the QPR values, paging indicators, and SNR values, the normalized measurement metrics generator 524 generates $x_1$, $x_2$ and $x_3$ in accordance with the Eq. 1, 2, and 3 or 1', 2', and 3'. The threshold generator 526 provides all five threshold values, T1, T2, $t_1$, $t_2$, and $t_3$ to the controller 528. In this embodiment, the threshold values are pre-determined to ensure performance based on expected false alarms and lower miss rate. However, the threshold values may be adjustable dynamically reflecting to the communication environment surrounding the terminal mobile.

It is understood by those skilled in the art that multi-stage detection could be reduced to signal stage or vice versa depending on the dynamically determined parameters. Finally, collecting the threshold values from the threshold generator 526, the normalized measurement metrics from the generator 524, and the SNR values from SNR calculator 522, the controller 528 could determine whether the mobile terminal shall be waken up or not in accordance of the embodiments shown in the FIG. 1 and/or FIG. 2. It is further understood that the various calculators, generators can be implemented either in hardware or software means. For example, all the processing power can be provided by a microprocessor such as a controller in the mobile terminal. Alternatively, certain modules can be implemented by separate hardware modules that are operated independently from the controller. In one embodiment of the present invention, the controller 528 may comprise a first stage unit for determining whether a first normalized indicator measurement ($x_1$) is between a first and a second thresholds ($t_1$ and $t_2$ respectively) wherein $t_i$ indicates a boundary for tolerating a miss call and $t_2$ indicates a boundary for tolerating a false alarm. The controller 528 may also comprise a second stage unit for comparing a second normalized indicator measurement ($x_3$) derived based on both the first and second paging indicators against a third threshold ($t_3$). In this regards, the first stage unit may further include a first threshold comparison unit for comparing the first normalized indicator measurement ($x_1$) against the first threshold ($t_1$) and a second threshold comparison unit for comparing the first normalized indicator measurement ($x_1$) against the second threshold ($t_2$). Moreover, the controller 528 may comprise a first SNR threshold comparison unit for comparing a first indicator signal-to-noise strength (SNR1) corresponding to the first paging indicator (I1) against a first low threshold (T1) to eliminate the unreliable first paging indicator (I1). Similarly, the controller 528 may comprise a second SNR threshold comparison unit for comparing a second indicator signal-to-noise strength (SNR2) corresponding to the second paging indicator (I2) against a second low threshold (T2) to eliminate the unreliable second paging indicator (I2).

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims.

Accordingly, it is appropriate that the appended claims be construed broadly and in a manner consistent with the scope of the invention, as set forth in the following claims.

What is claimed is:

1. A method for detecting paging indicators through a paging channel for removing a mobile terminal from an idle mode in a wireless communication system, the method comprising:
    receiving a first paging indicator (I1);
        determining whether a first indicator measurement ($x_1$) corresponding to the first paging indicator is between a first and a second thresholds ($t_1$ and $t_2$ respectively) wherein $t_1$ indicates a boundary for tolerating a miss call and $t_2$ indicates a boundary for tolerating a false alarm;
        receiving a second paging indicator (I2) which is a temporal diversity counterpart of the first paging indicator; and
        comparing a second indicator measurement ($x_3$) derived based on both the first and second paging indicators against a third threshold ($t_3$),
        wherein the mobile terminal is removed from the idle mode when $x_1$ is between $t_1$ and $t_2$, and $x_3$ is larger than $t_3$,
        wherein $t_1$ and $t_2$ are derived based on signal-to-noise ratios (SNRs) corresponding to the first and second paging indicators respectively, and $t_3$ is derived based on SNR corresponding to both the first and second paging indicators,
        wherein the indicator measurements and the SNR based thresholds are adaptive to variations of channel conditions and predetermined configurations of the paging channel.

2. The method of claim 1 wherein if the first indicator measurement ($x_1$) is smaller than the first threshold ($t_1$), the mobile terminal stays in the idle mode.

3. The method of claim 1 wherein the determining further includes:
    comparing the first indicator measurement ($x_1$) against the first threshold ($t_1$); and
    comparing the first indicator measurement ($x_1$) against the second threshold ($t_2$),
    wherein if the first indicator measurement ($x_1$) is larger than the second threshold ($t_2$), the mobile terminal wakes up.

4. The method of claim 1, further comprising comparing a first indicator signal-to-noise strength (SNR1) corresponding to the first paging indicator (I1) against a first low threshold (T1) to eliminate the unreliable first paging indicator (I1).

5. The method of claim 1, further comprising comparing a second indicator signal-to-noise strength (SNR2) corresponding to the second paging indicator (I2) against a second low threshold (T2) to eliminate the unreliable second paging indicator (I2).

6. The method of claim 1, wherein the first threshold ($t_1$) is a function of a signal-to-noise strength corresponding to the first paging indicator, the second threshold ($t_2$) is a function of a signal-to-noise strength corresponding to the first paging indicator, and the third threshold ($t_3$) is a function of a combined signal-to-noise strength of the first and the second paging indicators.

7. The method of claim 1, wherein the indicator measurements are derived based on a pilot weighted combining method in which the first indicator measurement is derived based on channel gain provided from a base station and estimated radio channel information.

8. The method of claim 7 wherein the first indicator measurement is represented mathematically by $$x_1 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l}))}{QPR \cdot \sum_{l=1}^{L}\sum_{k=1}^{K}|a_{1,k,l}|^2},$$

wherein K1 is a number of multi-paths for the first paging indicator, L is a number of quadrature phase shift keying (QPSK) symbols, and QPR represents the channel gain, and a received symbol signal is expressed as $r_{i,k,l}$, and a corresponding estimated radio channel information is expressed as $a_{i,k,l}$ where i is the paging indicator index (1 or 2 for I1 or I2, respectively), k is the index of the multi-path, and l is the QPSK symbol index.

9. The method of claim 8, wherein the second indicator measurement is given by:

$$x_2 = \frac{\sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR \cdot \sum_{l=1}^{L}\sum_{k=1}^{K}|a_{2,k,l}|^2}$$

and $$x_3 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l})) + \sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR\left(\sum_{l=1}^{L}\sum_{k=1}^{K1}|a_{1,k,l}|^2 + \sum_{l=1}^{L}\sum_{k=1}^{K2}|a_{2,k,l}|^2\right)}.$$

10. The method of claim 1, wherein the indicator measurements are derived based on a maximal ratio combining method in which the first indicator measurement is $$x_1 = \frac{\sum_{l=1}^{L}\sum_{k=1}^{K1}\left(\text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right)\right)}{QPR \cdot \sum_{l=1}^{L}\sum_{k=1}^{K}\frac{|a_{1,k,l}|^2}{\sigma_{1,k,l}^2}}$$

$$x_2 = \frac{\sum_{l=1}^{L}\sum_{k=1}^{K2}\left(\text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right)\right)}{QPR \cdot \sum_{l=1}^{L}\sum_{k=1}^{K}\frac{|a_{2,k,l}|^2}{\sigma_{2,k,l}^2}}$$

and

-continued $$x_3 = \frac{\sum_{l=1}^{L}\sum_{k=1}^{K1}\left(\begin{array}{l}\text{Re}\left(\frac{a^*_{1,k,l} \cdot r_{1,k,l}}{\sigma^2_{1,k,l}}\right)+ \\ \text{Im}\left(\frac{a^*_{1,k,l} \cdot r_{1,k,l}}{\sigma^2_{1,k,l}}\right)\end{array}\right)+ \sum_{l=1}^{L}\sum_{k=1}^{K2}\left(\begin{array}{l}\text{Re}\left(\frac{a^*_{2,k,l} \cdot r_{2,k,l}}{\sigma^2_{2,k,l}}\right)+ \\ \text{Im}\left(\frac{a^*_{2,k,l} \cdot r_{2,k,l}}{\sigma^2_{2,k,l}}\right)\end{array}\right)}{QPR\left(\sum_{l=1}^{L}\sum_{k=1}^{K1}\frac{|a_{1,k,l}|^2}{\sigma^2_{1,k,l}} + \sum_{l=1}^{L}\sum_{k=1}^{K2}\frac{|a_{2,k,l}|^2}{\sigma^2_{2,k,l}}\right)}$$

wherein K1 is a number of multi-paths for the first paging indicator, L is a number of quadrature phase shift; keying (QPSK) symbols, and QPR represents a channel gain, and a received symbol signal is expressed as $r_{i,k,l}$, and a corresponding estimated radio channel information is expressed as $a_{i,k,l}$ where i is the paging indicator index (1 or 2 for I1 or I2, respectively), k is the index of the multi-path, and l is the QPSK symbol index, and $\sigma_{i,k,l}^2$ is the noise variance for the ith paging indicator, the kth multi-path, and the lth symbol.

11. The method of claim 1, wherein the first and second paging indicators are spaced apart in time by approximately 20 milliseconds in a CDMA2000 communications system.

12. The method of claim 1, wherein the thresholds $t_1$, $t_2$, $t_3$ are derived after an expected miss rate is first determined.

13. The method of claim 1, wherein the indicator measurements are functions of and normalized over parameters being selected from a combination of:
   QPR; and
   estimated radio channel information as $a_i$, where i is the paging indicator index (1 or 2 for I1 or I2, respectively).

14. The method of claim 1, wherein the indicator measurements are functions of parameters being selected from a combination of:
   received symbol signal;
   estimated radio channel information; and
   noise variance for the indicator measurements.

15. The method of claim 1, wherein the thresholds $t_1$, $t_2$, $t_3$ are functions of parameters being selected from a combination of:
   SNR;
   QPR; and
   estimated radio channel information as $a_i$, where i is the paging indicator index (1 or 2 for I1 or I2, respectively), if the indicator measurements are not normalized over parameters being selected from the combination.

16. A method of claim 1, further comprising estimating the signal-to-noise ratio (SNR) from the parameters being selected from a group of:
   a total received power-to-interference ratio ($Ec_p$/Io) of the pilot chip energy and the total received input power spectral density including both signal and interference;
   a function n*(QPR)$^2$*$Ec_p$/Io) of a multiple n of the square of QPR and a ratio of the chip energy for the pilot signal and the total received input power spectral density including both signal and interference, wherein n is a positive number and equals (1+G), where G is the geometry.

17. A method of 16, wherein the total received input power spectral density including both signal and interference is a combination of the post-channel transmitted power spectral density and the power spectral density of a band-limited white noise and interference from other cells.

18. A method for detecting paging indicators for removing a mobile terminal from an idle mode in a CDMA wireless communication system, the method comprising:
   receiving a first paging indicator (I1);
   comparing a first indicator signal-to-noise strength (SNR1) corresponding to the first paging indicator (I1) against a first low threshold (T1) to eliminate the unreliable first paging indicator if SNR1 is less than T1;
   determining whether a first indicator measurement ($x_1$) corresponding to the first paging indicator is between a first and a second thresholds ($t_1$ and $t_2$ respectively) wherein $t_1$ indicates a boundary for tolerating a miss call and $t_2$ indicates a boundary for tolerating a false alarm;
   receiving a second paging indicator (I2) which is temporal diversity counterpart of the first paging indicator;
   comparing a second indicator signal-to-noise strength (SNR2) corresponding to the second paging indicator (I2) against a second low threshold (T2) to eliminate unreliable second paging indicator if SNR2 is less than T2; and
   comparing a second indicator measurement ($x_3$) derived based on both the first and second paging indicators against a third threshold ($t_3$),
   wherein the mobile terminal is removed from the idle mode when $x_1$ is between $t_1$ and $t_2$, and $x_3$ is larger than $t_3$,
   wherein $t_1$ and $t_2$ are functions of signal-to-noise ratios (SNRs) corresponding to the first and second paging indicators respectively, and $t_3$ is derived based on both SNRs,
   wherein the indicator measurements and the SNR based thresholds are adaptive to variations of channel conditions and predetermined channel configurations.

19. The method of claim 18 wherein if the first indicator measurement ($x_1$) is smaller than the first threshold ($t_1$), the mobile terminal stays in the idle mode.

20. The method of claim 18 wherein the determining further includes:
   comparing the first indicator measurement ($x_1$) against a first threshold ($t_1$); and
   comparing the first indicator measurement ($x_1$) against the second threshold ($t_2$),
   wherein if the first indicator measurement ($x_1$) is larger than the second threshold ($t_2$), the mobile terminal wakes up.

21. The method of claim 18 wherein the thresholds $t_1$, $t_2$, $t_3$ are derived after an expected miss rate is first determined.

22. The method of claim 21 wherein the thresholds are determined as:

$$t_1 = 1 - \frac{Q^{-1}(P_M(x<t_1))}{\sqrt{SNR1}}$$

$$t_2 = \frac{Q^{-1}(P_F(x>t_2))}{\sqrt{SNR1}}$$

$$t_3 = 1 - \frac{Q^{-1}((\alpha_{m2})}{\sqrt{SNR1+SNR2}},$$

where $P_M(x<t_1)$ represents a probability for a miss call when a normalized indicator measurement is smaller than $t_1$, $P_F(x>t_2)$ represents a probability for a false alarm, SNR1 and SNR2 are signal-to-noise ratios for the first and second paging indicators respectively, and $$\alpha_{m2} = \frac{(\alpha_m - P_M(x < t_1))}{Q((1-t_2)\sqrt{SNR1}) - Q((1-t_1)\sqrt{SNR1})} \text{ with } \alpha_m$$

represents the expected miss rate.

23. The method of claim 18, wherein $t_1$, $t_2$ or $t_3$ is approximated by series expansion as represented by $$t = c_0 + c_1 \cdot SNRdB + c_2 \cdot SNRdB^2 + \ldots$$

wherein SNRdB is SNR in dB, $c_0$, $c_1$, $c_1$ and other similar constants are predetermined coefficients.

24. The method of claim 23, wherein $t_1$, $t_2$ or $t_3$ is approximated by a piece-wise linear representation as represented by $$t = t(i) + (SNRdB - SNRdB(i)) \cdot R_s$$

wherein (SNRdB(i), t(i)) is an intercept point, $R_s$ is a slope in a linear representation of the equation, i is a piece-wise linear segment index, SNRdB(i)≦SNRdB≦SNRdB(i+1), and SNRdB is a corresponding SNR.

25. The method of claim 18, wherein the indicator measurements are functions of and normalized over parameters being selected from a combination of:
   QPR; and
   estimated radio channel information as $a_i$, where i is the paging indicator index (1 or 2 for I1 or I2, respectively).

26. The method of claim 18, wherein the indicator measurements are functions of parameters being selected from a combination of:
   received symbol signal;
   estimated radio channel information; and
   noise variance for the indicator measurements.

27. The method of claim 18, wherein the thresholds $t_1$, $t_2$, $t_3$ are functions of parameters being selected from a combination of:
   SNR;
   QPR; and
   estimated radio channel information as $a_i$, where i is the paging indicator index (1 or 2 for I1 or I2, respectively), if the indicator measurements are not normalized over parameters being selected from the combination.

28. A method of claim 18, further comprising estimating the signal-to-noise ratio (SNR) from the parameters being selected from a group of:
   a total received power-to-interference ratio ($Ec_p$/Io) of the pilot chip energy and the total received input power spectral density including both signal and interference;
   a function $n^*(QPR)^2*Ec_p$/Io of a multiple n of the square of QPR and a ratio of the chip energy for the pilot signal and the total received input power spectral density including both signal and interference, wherein n is a positive number and equals (1+G), where G is the geometry.

29. A method of 28, wherein the total received input power spectral density including both signal and interference is a combination of the post-channel transmitted power spectral density and the power spectral density of a band-limited white noise and interference from other cells.

30. A method of 18, wherein the thresholds are expressed under Rayleigh flat fading condition as:

$$t_1 = 1 - \frac{\sqrt{C_m/(1-C_m)}}{\sqrt{SNR}};$$

and

-continued $$t_2 = \frac{\sqrt{C_f/(1-C_f)}}{\sqrt{SNR}},$$

wherein $C_m = (1 - 2P_M(x < t_1))^2$, wherein $C_f = (1 - 2P_F(x > t_2))^2$, wherein $$P_M(x < t) = \frac{1}{2}\left[1 - \sqrt{\frac{SNR(1-t)^2}{1 + SNR(1-t)^2}}\right],$$

and
wherein $$P_F(x > t) = \frac{1}{2}\left[1 - \sqrt{\frac{SNR \cdot t^2}{1 + SNR \cdot t^2}}\right].$$

31. A method of 30, wherein the threshold is further expressed under Rayleigh flat fading condition as:

$$t_3 \cong 1 - \frac{\sqrt{2C_m/(1-C_m)}}{\sqrt{SNR}},$$

wherein $C_m = (1 - 2P_M(x < t_3))^2$, wherein $$P_M(x < t) = \frac{1}{2}\left[1 - \sqrt{\frac{SNR(1-t)^2(SNR(1-t)^2 + 3)^2}{(SNR(1-t)^2 + 2)^3}}\right],$$

and
wherein $$P_F(x > t) = \frac{1}{2}\left[1 - \sqrt{\frac{SNR \cdot t^2(SNR \cdot t^2 + 3)^2}{(SNR \cdot t^2 + 2)^3}}\right].$$

32. A system for detecting paging indicators through a paging channel for removing a mobile terminal from an idle mode in a wireless communication system, the system comprising:
   a receiver for receiving a first paging indicator (I1) and a second paging indicator (I2) which is a temporal diversity counterpart of the first paging indicator;
   a measurement metrics generator for calculating indicator measurements corresponding to the first and second paging indicators;
   a thresholds generator for generating one or more predetermined thresholds corresponding to miss calls and false alarm;
   a first stage unit for determining whether a first indicator measurement ($x_1$) is between a first and a second thresholds ($t_1$ and $t_2$ respectively) wherein $t_1$ indicates a boundary for tolerating a miss call and $t_2$ indicates a boundary for tolerating a false alarm;
a signal-to-noise ratio (SNR) calculator for calculating signal-to-noise ratios corresponding to the paging indicators; and
a second stage unit for comparing a second indicator measurement ($x_3$) derived based on both the first and second paging indicators against a third threshold ($t_3$),
wherein the mobile terminal is removed from the idle mode when $x_1$ is between $t_1$ and $t_2$, and $x_3$ is larger than $t_3$,
wherein $t_1$ and $t_2$ are derived based on signal-to-noise ratios of the first and second paging indicators respectively, and $t_3$ is derived based on SNR of both the first and second paging indicators.

33. The system of claim 32 wherein if the first indicator measurement ($x_1$) is smaller than the first threshold ($t_1$), the mobile terminal stays in the idle mode.

34. The system of claim 32 wherein the first stage unit further includes:
a first threshold comparison unit for comparing the first indicator measurement ($x_1$) against the first threshold ($t_1$); and
a second threshold comparison unit for comparing the first indicator measurement ($x_1$) against the second threshold ($t_2$),
wherein if the first indicator measurement ($x_1$) is larger than the second threshold ($t_2$), the mobile terminal wakes up.

35. The system of claim 32, further comprising a first SNR threshold comparison unit for comparing a first indicator signal-to-noise strength (SNR1) corresponding to the first paging indicator (I1) against a first low threshold (T1) to eliminate the unreliable first paging indicator (I1).

36. The system of claim 32, further comprising a second SNR threshold comparison unit for comparing a second indicator signal-to-noise strength (SNR2) corresponding to the second paging indicator (I2) against a second low threshold (T2) to eliminate the unreliable second paging indicator (I2).

37. The system of claim 32, wherein the first threshold ($t_1$) is a function of a signal-to-noise strength corresponding to the first paging indicator, the second threshold ($t_2$) is a function of a signal-to-noise strength corresponding to the first paging indicator, and the third threshold ($t_3$) is a function of a combined signal-to-noise strength of the first and the second paging indicators.

38. The system of claim 34, wherein the indicator measurements are derived based on a pilot weighted combining method in which the first indicator measurement is derived based on channel gain provided from a base station and estimated radio channel information.

39. The system of claim 38 wherein the first indicator measurement is represented mathematically by $$x_1 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l}))}{QPR \cdot \sum_{l=1}^{L}\sum_{k=1}^{K}|a_{1,k,l}|^2},$$

wherein K1 is a number of multi-paths for the first paging indicator, L is a number of quadrature phase shift keying (QPSK) symbols, and QPR represents the channel gain, and a received symbol signal is expressed as $r_{i,k,l}$, and a corresponding estimated radio channel information is expressed as $a_{i,k,l}$ where i is the paging indicator index (1 or 2 for I1 or I2, respectively), k is the index of the multi-path, and l is the QPSK symbol index.

40. The system of claim 39, wherein the second indicator measurement is given by:

$$x_2 = \frac{\sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR \cdot \sum_{l=1}^{L}\sum_{k=1}^{K}|a_{2,k,l}|^2} \text{ and}$$

$$x_3 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l})) + \sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR\left(\sum_{l=1}^{L}\sum_{k=1}^{K1}|a_{1,k,l}|^2 + \sum_{l=1}^{L}\sum_{k=1}^{K2}|a_{2,k,l}|^2\right)}.$$

41. The system of claim 32, wherein the indicator measurements are derived based on a maximal ratio combining method in which the first indicator measurement is $$x_1 = \frac{\sum_{l=1}^{L}\sum_{k=1}^{K1}\left(\text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right)\right)}{QPR \cdot \sum_{l=1}^{L}\sum_{k=1}^{K}\frac{|a_{1,k,l}|^2}{\sigma_{1,k,l}^2}}$$

$$x_2 = \frac{\sum_{l=1}^{L}\sum_{k=1}^{K2}\left(\text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right)\right)}{QPR \cdot \sum_{l=1}^{L}\sum_{k=1}^{K}\frac{|a_{2,k,l}|^2}{\sigma_{2,k,l}^2}} \text{ and}$$

$$x_3 = \frac{\sum_{l=1}^{L}\sum_{k=1}^{K1}\left(\text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right)\right) + \sum_{l=1}^{L}\sum_{k=1}^{K2}\left(\text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right)\right)}{QPR\left(\sum_{l=1}^{L}\sum_{k=1}^{K1}\frac{|a_{1,k,l}|^2}{\sigma_{1,k,l}^2} + \sum_{l=1}^{L}\sum_{k=1}^{K2}\frac{|a_{2,k,l}|^2}{\sigma_{2,k,l}^2}\right)}$$

wherein K1 is a number of multi-paths for the first paging indicator, L is a number of quadrature phase shift keying (QPSK) symbols, and QPR represents a channel gain, and a received symbol signal is expressed as $r_{i,k,l}$, and a corresponding estimated radio channel information is expressed as $a_{i,k,l}$ where i is the paging indicator index (1 or 2 for I1 or I2, respectively), k is the index of the multi-path, and l is the QPSK symbol index, and $\sigma_{i,k,l}^2$ is the noise variance for the ith paging indicator, the kth multi-path, and the ith symbol.

42. The system of claim 32, wherein the first and second paging indicators are spaced apart in time by approximately 20 milliseconds in a CDMA2000 communications system.

43. The system of claim 32, wherein the indicator measurements are functions of and normalized over parameters being selected from a combination of:
QPR; and estimated radio channel information as $a_i$, where i is the paging indicator index (1 or 2 for I1 or I2, respectively).

44. The system of claim 32, wherein the indicator measurements are functions of parameters being selected from a combination of:
- received symbol signal;
- estimated radio channel information; and
- noise variance for the indicator measurements.

45. The system of claim 32, wherein the thresholds $t_1, t_2, t_3$ are functions of parameters being selected from a combination of:
- SNR;
- QPR; and
- estimated radio channel information as ai, where i is the paging indicator index (1 or 2 for I1 or I2, respectively),
- if the indicator measurements are not normalized over parameters being selected from the combination.

46. A system of claim 32, wherein the signal-to-noise calculator further estimating the signal-to-noise ratio (SNR) from the parameters being selected from a group of:
- a total received power-to-interference ratio ($Ec_p/Io$) of the pilot chip energy and the total received input power spectral density including both signal and interference;
- a function $n*(QPR)^2*Ec_p/Io$ of a multiple n of the square of QPR and a ratio of the chip energy for the pilot signal and the total received input power spectral density including both signal and interference, wherein n is a positive number and equals (1+G), where G is the geometry.

47. A system of 46, wherein the total received input power spectral density including both signal and interference is a combination of the post-channel transmitted power spectral density and the power spectral density of a band-limited white noise and interference from other cells.

* * * * *